United States Patent
Adkins et al.

(10) Patent No.: US 7,958,325 B2
(45) Date of Patent: Jun. 7, 2011

(54) HANDLING TEMPORARY FILES IN A FILE SYSTEM WITH SNAPSHOTS

(75) Inventors: Janet Elizabeth Adkins, Austin, TX (US); Joon Chang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 11/853,442

(22) Filed: Sep. 11, 2007

(65) Prior Publication Data

US 2009/0070535 A1 Mar. 12, 2009

(51) Int. Cl.
*G06F 12/00* (2006.01)
*G06F 13/00* (2006.01)
*G06F 13/28* (2006.01)

(52) U.S. Cl. .................................. 711/162; 707/639
(58) Field of Classification Search .................. 711/162; 707/203, 639
See application file for complete search history.

(56) References Cited

U.S. PATENT DOCUMENTS

| | | | | |
|---|---|---|---|---|
| 5,819,292 A * | 10/1998 | Hitz et al. | ............................ | 1/1 |
| 6,401,093 B1 * | 6/2002 | Anand et al. | .................... | 707/10 |
| 2003/0159007 A1 * | 8/2003 | Sawdon et al. | ............... | 711/154 |
| 2005/0138312 A1 * | 6/2005 | Kubo et al. | ................... | 711/162 |
| 2006/0041727 A1 | 2/2006 | Adkins et al. | | |
| 2007/0022117 A1 | 1/2007 | Keohane et al. | | |
| 2008/0046476 A1 * | 2/2008 | Anderson et al. | ............. | 707/200 |

* cited by examiner

*Primary Examiner* — Stephen C Elmore
*Assistant Examiner* — Mark A Giardino, Jr.
(74) *Attorney, Agent, or Firm* — Yee & Associates, P.C.; David A. Mims, Jr.

(57) ABSTRACT

A temporary file is identified. The temporary file includes a data block containing a first file image. A determination is made whether the temporary block has been included in a previous snapshot. Responsive to receiving a modification of the temporary block that has been included in the previous snapshot, a modified first image is created. The modified image is stored in the original file block, and the original image is copied to a newly allocated block. The original first block is updated to include a reference to the second block.

18 Claims, 5 Drawing Sheets

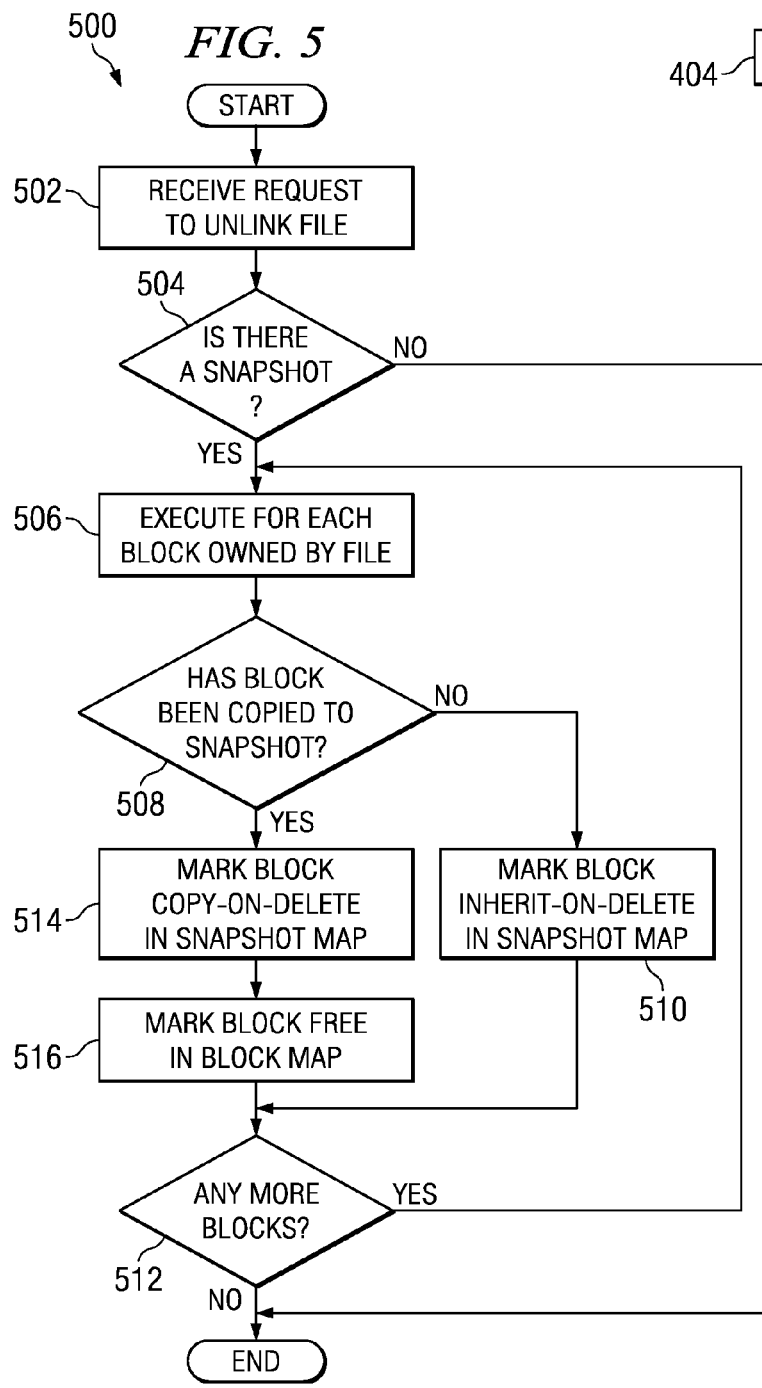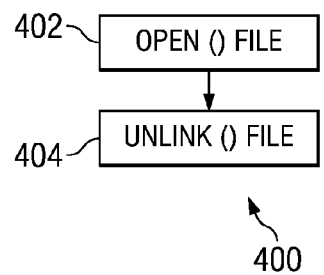

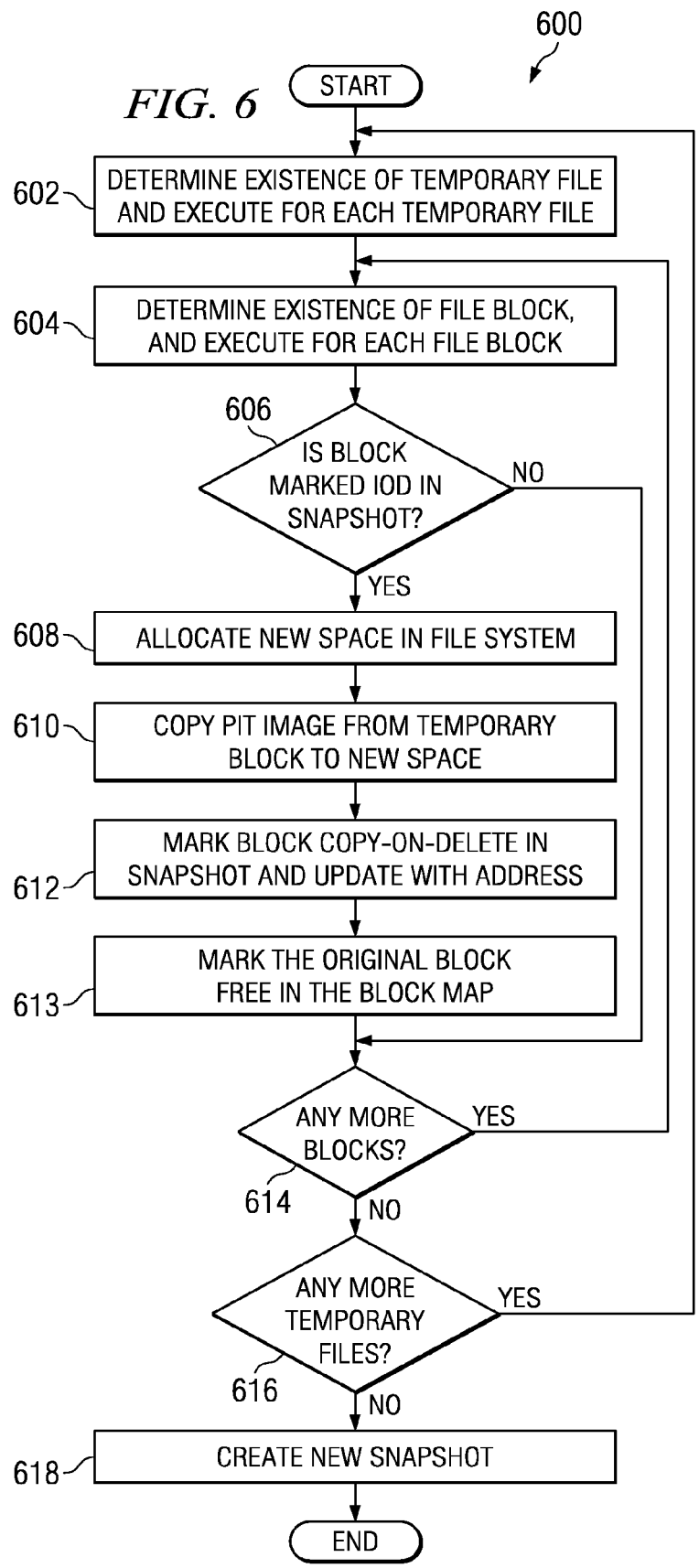

HANDLING TEMPORARY FILES IN A FILE SYSTEM WITH SNAPSHOTS

BACKGROUND OF THE INVENTION

1. Field of the Invention

The present invention relates generally to systems, methods and computer code products for a data processing system. More specifically, the present invention relates to systems, methods and computer code products for a data processing system using snapshot images of a file system to accurately backup temporary data files.

2. Description of the Related Art

Data processing systems often employ a snapshot module to facilitate data storage and retrieval operations. The snapshot module tracks writes to a data set on an active data storage device, creating a point-in-time instance of the data set. The active data storage device may be a memory such as the data processing system's memory, or a hard disk drive. The snapshot module creates the point-in-time instance of the data set of the active data storage device and uses the point-in-time instance to perform operations on the data set. For example, the snapshot module may mirror a point-in-time instance of the data set to an alternate data storage device by copying to the alternate data storage device only the data blocks of the data set that have been modified.

The snapshot module monitors and tracks the modified data blocks. The data processing device modifies data blocks of the data set stored on the active data storage device. The snapshot module tracks the data blocks of the data set that have been modified and creates a point-in-time instance of the modified data set. The snapshot module may store the point-in-time instance to the source data storage device by copying only the modified data blocks back to the source data storage device. As only modified data blocks are copied, the bandwidth required to store the data set is reduced.

File system snapshots thus establish a consistent block level image of the file system at a particular point-in-time. Employing the snapshot module allows backups of the active file system to be created. A snapshot copies the modified and deleted blocks that were in use in the file system at the point-in-time the snapshot was created in order to maintain the point-in-time image.

Unfortunately, storing multiple backup instances as snapshots may require additional data storage capacity that far exceeds the size of the data set that must be backed up, particularly if the data set is backed up frequently and if each backup instance is stored for an extended time. By including the snapshot module inside the file system, the number of input/output (I/O) operations to the snapshot module can be reduced. Furthermore, snapshot modules included within the file system can utilize an "inherit-on-delete" block management to reduce the redundant data sets that must be stored in a backup instance. Instead of deleting system blocks re-recording their contents in a snapshot, "inherit-on-delete" block management transfers ownership of deleted system blocks to the snapshot module rather than performing the duplicitous deletion and re-recordation of system blocks.

"Inherit-on-delete" block management has problems inheriting temporary files. A temporary file is a file for which there is a remaining reference (i_count>0) to the file location even after the file has been removed (i_nlink==0). Temporary files may still modify the pages of the file at the location that has been inherited by the snapshot while the reference remains on the temporary file. Therefore, the snapshot may not provide an accurate record of the inherited file at the point-in-time when the file was inherited. An open reference to the temporary file allows files at the referenced location to be altered, even after the location has been inherited by the snapshot.

SUMMARY OF THE INVENTION

Data processing systems, computer implemented methods, and computer program products are provided for creating snapshot images of a file system. A temporary file is identified. The temporary file includes a data block containing a first file image. A determination is made whether the temporary block has been included in a previous snapshot. Responsive to receiving a modification of the temporary block that has been included in the previous snapshot, a modified first image is created. The modified image is stored in the original file block, and the original image is copied to a newly allocated block. The original file block is updated to include a reference to the newly allocated block.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a flowchart showing a process of unlinking a file to make the file temporary in accordance with an illustrative embodiment;

FIG. 5 is a flowchart showing a process of making a file temporary in accordance with an illustrative embodiment;

FIG. 6 is flowchart showing a flowchart for a kernel process of making a new snapshot in accordance with an illustrative embodiment.

DETAILED DESCRIPTION OF THE PREFERRED EMBODIMENT

Figure 1:
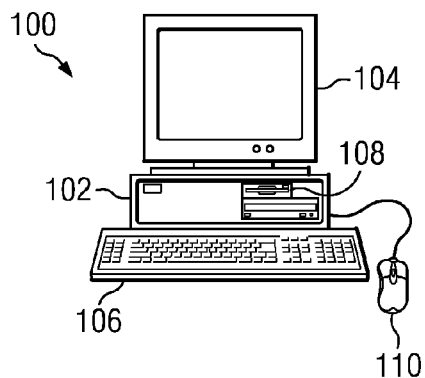
FIG. 1 is a pictorial representation of a data processing system in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices could include, for example, a joystick, a touchpad, a touch screen, a trackball, and a microphone.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
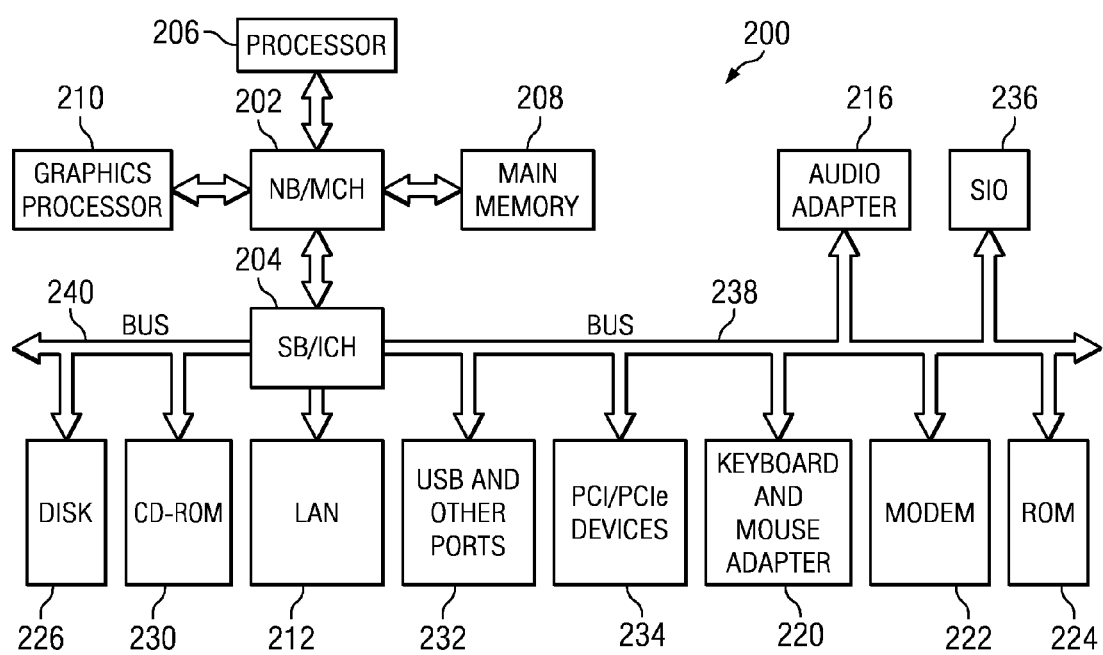
FIG. 2 is a step diagram of a data processing system in which illustrative embodiments may be implemented.

Next, FIG. 2 depicts a Step diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) and other ports 232. PCI/PCIe devices 234 are coupled to south bridge and I/O controller hub 204 through bus 238. Hard disk drive (HDD) 226 and CD-ROM 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP® or IBM® AIX® (Microsoft® and Windows XP® are trademarks of Microsoft Corporation in the United States, other countries, or both; IBM® and AIX® are trademarks of International Business Machines Corporation in the United States, other countries, or both). An object oriented programming system, such as the Java® programming system, may run in conjunction with the operating system and provides calls to the operating system from Java® programs or applications executing on data processing system 200. Java® and all Java®-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

The data processing system contains a snapshot module to handle information backups. When a page-out is intercepted by the snapshot, the block being written is checked to see if it has been inherited by the snapshot. If the block being written has been inherited by the snapshot, the inherited block is copied to a new location. The inherited block is then marked as "copy-on-delete." This allows the temporary modified pages to be paged out to its home extent repeatedly.

If another snapshot is created while the temporary file still has an outstanding reference, then the pages associated with the temporary file must all be converted to copy-on-delete if not already marked as such. This is to ensure that subsequent point-in-time snapshots are able to understand inherit-on-delete files from previous point-in-time snapshots. Failure to convert pages associated with the temporary file to copy-on-delete will cause subsequent point-in-time snapshots to not understand the inherit-on-delete files from the previous point-in-time snapshots.

Figure 3:
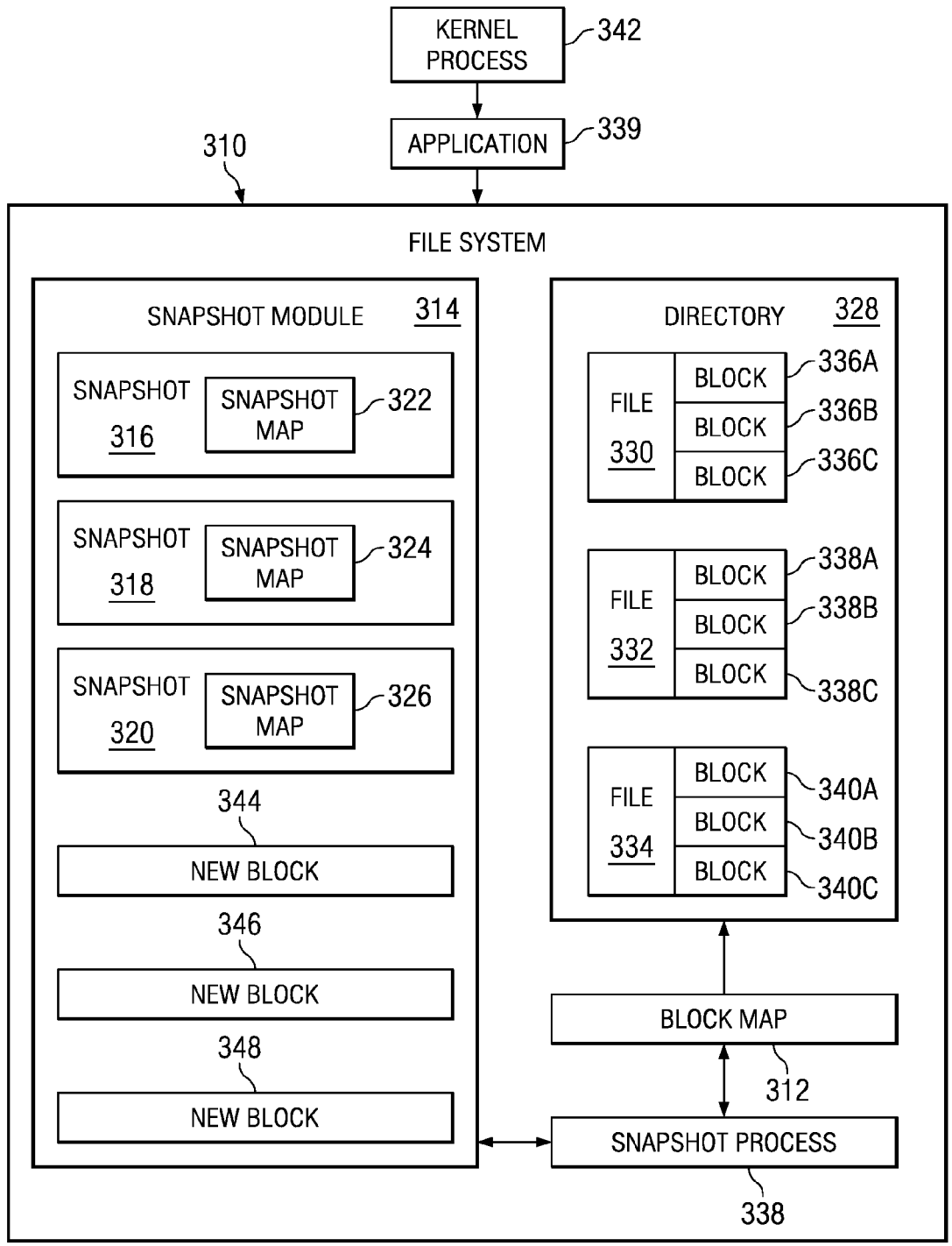
FIG. 3 is a block diagram of a snapshot process executed on a data processing system in accordance with an illustrative embodiment.

Referring now to FIG. 3, a block diagram of snapshot process executed on a data processing system is shown in accordance with an illustrative embodiment. Data processing system of FIG. 3 is a data processing system, such as, without limitation, data processing system 100 in FIG. 1.

File system 310 is a software process to facilitate file storage and retrieval, and contains block map 312. Block map 312 tracks the allocated or freed state of each block within file system 310. Snapshot module 314 resides within file system 310, and establishes a consistent block level image of files and directories 328 at a point-in-time. Snapshot module 314 is used for creating backups of file system 310. Snapshot module 312 contains snapshots 316-320. Snapshots 316-320 each contain snapshot maps 322-326. Snapshot maps 322-326 map each block in block map 312 to the copied state of the block in the snapshot 316-320. The snapshot map allows the snapshot 316-320 to maintain the point-in-time image of the blocks when the snapshot was created.

File system 310 contains a directory 328 of files 330-334 stored in the file system. Each of files 330-334 have data contained within data blocks 336-340. When an application 339 opens or creates file 330, application 339 records data to data blocks 336A-336C of file system 310. So long as application 339 remains running, application 339 will hold open a reference to file 330 and data blocks 336A-336C.

File 330 is made temporary by receiving a request from a user process to access a file in file system 310. User process can be application 339. Application 339 opens the file. The reference count on file 330 is incremented by one. File 330 is then unlinked from its associated directory and data structure by kernel process 342. The link count on file 330 is decremented by one to 0. Thus, a user looking at directory 328 will no longer see file 330 listed in directory 328. So long as application 339 remains open, application 339 will still hold the reference to the file 330 and data blocks 336A-336C. While unlinked file 330 may be invisible to users looking at directory 328, file 330 with associated data blocks 336A-336C still exists to and is modifiable by application 339. At the point when application 339 closes file 330, resources, including data blocks 336A-336C are then released/freed from the file system 310 and marked free in block map 312.

When file 330 has been unlinked from directory 328 that references file 330, file 330 is a temporary file. Snapshot process 338 then determines whether a snapshot has previously been taken of file 330 by examining the snapshot maps 322-326. If there is not a snapshot, no snapshot maps containing references to the temporary file need to be updated.

For each block owned by file 330, snapshot process 338 determines whether that block has been copied to the snapshot. If blocks 336A-336C have not been copied to the snapshot, snapshot process 338 marks those un-copied blocks 336A-336C as "inherit-on-delete" in the snapshot map 322. Data blocks 336A-336C are not marked free in block map 312 since the snapshot map 322 now owns those blocks.

If blocks 336A-336C have been previously copied to the snapshot, snapshot process 338 marks blocks 336A-336C as copy-on-delete in the snapshot map 322. Data blocks 336A-336C are marked free in the persistent block map 312. When the file 330 closes references to blocks 336A-336C, the blocks are then marked as free in the working block map 312.

When generating a new snapshot, snapshot process 338 checks files 330-334 to determine if any are temporary files. Files that have a reference count >0 and a link count of 0 are temporary files.

For each temporary file, snapshot process 338 determines whether blocks owned by the file have been marked as inherit-on-delete in the snapshot map. That is, snapshot process 338 determines for temporary file 330 whether blocks 336A-336C are marked inherited in snapshot map 322. If any of blocks 336A-336C has been marked as inherit-on-delete, snapshot process 338 allocates new blocks 344-348 in the file system 310. The point-in-time image stored in blocks 336A-336C is then copied from blocks 336A-336C to newly allocated blocks 344-348.

Snapshot process 338 then marks blocks 336A-336C as copy-on-delete in the snapshot map 322. Snapshot process 338 updates snapshot 316 so that the addresses of the newly allocated blocks 344-348 are included in the snapshot map 322. Blocks 344-348 now contain the contents of the original data block. Snapshot process 338 marks blocks 336A-336C free in the persistent map of block map 312.

Referring now to FIG. 4, a flowchart for a process of unlinking a file to make the file temporary is shown, in accordance with an illustrative embodiment. Process 400 is a software process such as kernel process 342 of FIG. 3.

User process 400 opens a file in the file system. Process 400 opens the file (step 402). Process 400 then unlinks the file from its associated directory and data structure (step 404). The file has been unlinked from the directory that references the file. The file is now a temporary file. A user looking at the directory previously containing the file will no longer see the file listed therein. So long as the application that opened the file remains active, the application will hold a reference to the file. A reference to any data blocks of the file are likewise held open. While the temporary file may be invisible to users looking at directory, the temporary file and its associated data blocks still exists to the application that opened the file, and the data blocks are modifiable by that application. When the application closes the file, resources, including the associated data blocks are then released/freed from the file system and freed from block map.

Referring now to FIG. 5, a flowchart for a process of making a file temporary is shown, in accordance with an illustrative embodiment. Process 500 is a kernel process, such as kernel process 342 of FIG. 3.

Process 500 receives the request to unlink a file from a client process (step 502). Process 500 then determines whether there is a snapshot for the current file by examining the snapshot maps. If there is not a snapshot ("no" at step 504), the process terminates, with normal file deletion processing occurring thereafter since there are no snapshot maps containing references to the temporary file that need to be updated. If there is a snapshot ("yes" at step 504), process 500 then executes for each block of each temporary file (step 506).

For each block owned by the file, process 500 determines whether the block has been copied to the snapshot (step 508). If the block has not been copied to the snapshot ("no" at step 508), the block is marked inherit-on-delete (step 510) in the snapshot map. Process 500 then determines whether there are any additional blocks owned by the temporary file (step 512). If there are additional blocks ("yes" at step 512), the process returns to step 506 for additional processing of those blocks. If there are no additional blocks ("no" at step 512), process 500 ends.

Returning now to step 508, if the block has been copied to the snapshot ("yes" at step 508), the block is marked as copy-on-delete in the snapshot map (step 514). The block is then marked as free in the block map (step 516). Process 500 then returns to block 512 for additional processing.

Referring now to FIG. 6, a flowchart for a kernel process of making a new snapshot is shown in accordance with an illustrative embodiment. Process 600 is a software process such as process 338 of FIG. 3.

Process 600 checks the files to determine if there are any temporary files. Process 600 then executes for each block that is owned by the temporary file. Process 600 executes for each temporary file (step 602). More specifically, process 600 executes for each block of each temporary file (step 604).

Process 600 determines whether the block has marked inherit-on-delete in the snapshot map. That is, is the block part of a temporary file that has been inherited by the snapshot system? If the block has not been marked as IOD ("no" at step 606), process 600 proceeds to step 614 for further processing.

If the block has been marked IOD ("yes" at step 606), process 600 allocates new space in the file system (step 608). The point-in-time image stored in the block is then copied to the new space (step 610).

The original data block is then marked copy-on-delete in the snapshot. The snapshot is updated so that the address of the newly allocated block is included in the snapshot map (step 612). The newly allocated block now contains the contents of the original data block. Process 600 then marks the original block free in the block map (step 613).

Process 600 then determines if there are any remaining blocks in the temporary file currently being examined (step 614). If there are any remaining blocks in the temporary file ("yes" at step 614), process 600 returns to step 604 for processing of the remaining blocks.

If there are no remaining blocks in the temporary file ("no" at step 614), process 600 determines whether there any other temporary files. If there are additional temporary files ("yes" at step 616), process 600 returns to step 602 for processing of those files. If no additional temporary files exist ("no" at step 616), a new snapshot is created (step 618), with the process terminating thereafter.

Figure 7:
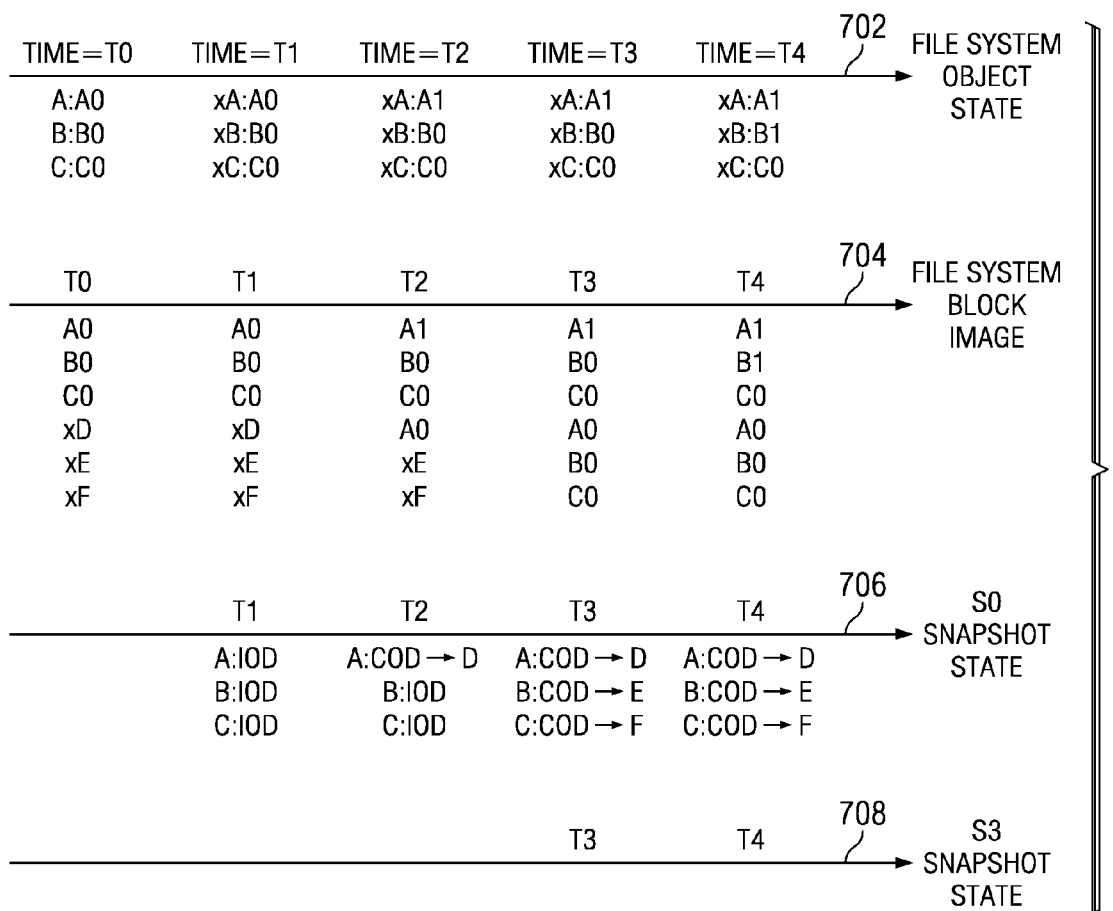
FIG. 7 is a block diagram of a series of point-in-time snapshots in accordance with an illustrative embodiment.

Referring now to FIG. 7, a block diagram of a series of point-in-time snapshots is shown in accordance with an illustrative embodiment. T0, T1, T2, T3, and T4 represent progressive points-in-time. File system object state 702 indicates the contents and ownership of blocks A, B, and C at each of points-in-time T0-T4. File system block image 704 indicates the contents of blocks A, B, C, D, E and F at each of points-in-time T0-T4. S0 snapshot state 706 indicates handling of blocks A, B, and C in the snapshot map S0 taken at point-in-time T0. S3 snapshot state 708 indicates handling of blocks A, B, and C in the snapshot map S3 taken at point-in-time T3.

At time T0, a snapshot S0 of a file is created. File system object has blocks A, B, and C where A0, B0, and C0 are the images of that block at time T0. At time T0, block A contains image A0, block B contains image B0, and block C contains image C0. Data blocks D, E and F remain unallocated.

Instead of deleting system blocks re-recording their contents in a snapshot, the "inherit-on-delete" block management transfers ownership of deleted system blocks to the snapshot module rather than performing the duplicitous deletion and re-recordation of system blocks. At T0, no blocks have been deleted or made temporary.

At time T1, a process such as application 339 of FIG. 3 opens and unlinks the file containing blocks A, B, and C. The file is marked as temporary, and is unlinked from the directory that references the file. The file is now a temporary file.

Blocks A, B, and C are now marked as temporary blocks. While the images A0, B0, and C0 remain unchanged within blocks A, B, and C, ownership of the blocks has been transferred from the persistent files to the snapshot system.

At T1, the file goes temporary. The "x" means that the file is unlinked (702). Blocks A, B, and C are marked inherit-on-delete in the snapshot map (706), indicating that ownership of the block has been transferred to the snapshot module. A0, B0, and C0 are still on disk at those blocks, they are now owned by snapshot map S0, (706).

At T2, the temporary file has been modified. Image A0 stored in block A has been modified to A1. Because file 702 is a temporary file and block A has been marked "inherit-on-delete," indicating that block A is from a temporary file and has previously been included in a snapshot, new data block D is allocated in the file system. The T0 point-in-time image stored in block A is copied to new space D when a modification of block A is detected. Therefore at T2, block A contains image A1, block B contains image B0, block C contains image C0, and block D contains image A0 (704). Data blocks E and F remain unallocated.

Data block A is then marked copy-on-delete in the S0 snapshot map. Snapshot map S0 is updated so that the address of the newly allocated block D is included in the snapshot map at data block A (706).

At T3, a new snapshot S3 is created. The system recognizes that the file is a temporary file, thus all the blocks owned by the temp file are examined.

Data block A has already been copied. Therefore, the snapshot system does not modify data block A. Data block A remains marked copy-on-delete in the snapshot map, 706. The snapshot map S0 includes the address of newly allocated block D in the snapshot map at data block A. Upon closing of the temporary file, Data block A is then marked as free and unallocated in the working block map.

Because file 702 is a temporary file and blocks B and C had been marked "inherit-on-delete," indicating that blocks B and C are from a temporary file and have previously been included in a snapshot, new data blocks E and F are allocated in the file system. The T0 point-in-time image stored in blocks B and C are copied to the new data blocks E and F when snapshot S3 is created. Snapshot map 706 is updated to indicate blocks B and C have been copied-on-delete to blocks E and F, respectively (706).

Snapshot map S3 (708) contains no reference to data blocks A, B, or C since those blocks are not part of the point-in-time image preserved at time T3.

At time T4, the image B0 in data block B is modified to B1. The snapshot S3 that was taken at time T3 does nothing with data block B. Data block B was already deleted at time T3 when snapshot S3 was created. Furthermore, no alterations to the snapshot at S0 are made. The actions that normally occur on modification of a temporary file have already occurred when snapshot S3 was taken at time T3. B has already been copied to a new location and S0 snapshot has already been updated.

As implemented in a data processing system, when a page-out is intercepted by the snapshot, the block being written is checked to see if it has been inherited by the snapshot. If the block being written has been inherited by the snapshot, the inherited block is copied to a new location. The inherited block is then marked as "copy-on-delete."

If another snapshot is created while the temporary file still has an outstanding reference, then the blocks associated with the temporary file must all be converted to copy-on-delete if not already marked as such. This is to ensure that subsequent point-in-time snapshots are able to understand inherit-on-delete files from previous point-in-time snapshots. Failure to convert blocks associated with the temporary file to copy-on-delete will cause subsequent point-in-time snapshots to not understand the inherit-on-delete files from the previous point-in-time snapshots.

Thus, data processing systems, computer implemented methods, and computer program products are provided for creating snapshot images of a file system. A temporary file is identified. The temporary file includes a data block containing a first file image. A determination is made whether the temporary block has been included in a previous snapshot. Responsive to receiving a modification of the temporary block that has been included in the previous snapshot, a modified first image is created. The modified image is stored in the original file block, and the original image is copied to a newly allocated block. The original first block is updated to include a reference to the second block.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for creating snapshot images of a file system, the computer implemented method comprising:
    identifying a first temporary file comprising a first file block containing a first file image;
    responsive to identifying the first temporary file, determining whether the first file image has been marked to be moved to a snapshot module upon deletion of the first file image;
    responsive to a determination that the first file image has been marked to be moved to the snapshot module upon deletion and responsive to receiving a modification to the first file block; creating an image of the first file image including the modification to the first file block, placing the first file image in a storage block associated with the snapshot module, and storing the image of the first file image including the modification to the first file block in the first file block; and
    responsive to placing the first file image in the storage block, updating the first block to include a first reference address of the storage block, and marking the image of the first file image including the modification to the first file block to be copied to the snapshot module upon deletion of the image of the first file image including the modification to the first file block.

2. The computer implemented method of claim 1, wherein the file system utilizes "inherit-on-delete" block management.

3. The computer implemented method of claim 2, wherein the first temporary file has been marked inherit-on-delete.

4. The computer implemented method of claim 2, wherein the step of placing the first file image in the storage block further comprises allocating the storage block from a group of unallocated blocks, and placing the first file image in the storage block.

5. The computer implemented method of claim 2, further comprising terminating an open reference to the first file block, and responsive to terminating the open reference, marking the first file block as unallocated.

6. The computer implemented method of claim 1, wherein the first temporary file comprises a second file block containing a second file image, the method further comprising:
    creating a snapshot of the first temporary file;
    responsive to creating the snapshot, copying the second file image to a second storage block associated with the snapshot module; and
    responsive to copying the second file image to the second storage block, updating the second file block to include a second reference address of the second storage block.

7. The computer implemented method of claim 6, wherein the snapshot does not include the first file block or the second file block.

8. A computer program product stored in a computer-readable storage medium for creating snapshot images of a file system, the computer program product comprising:
    computer usable program code for identifying a first temporary file comprising a first file block containing a first file image;
    computer usable program code, responsive to identifying the first temporary file, for determining whether the first file image has been marked to be moved to a snapshot module upon deletion of the first file image;
    computer usable program code, responsive to a determination that the first file image has been marked to be moved to the snapshot module upon deletion and responsive to receiving a modification to the first file block; for creating an image of the first file image including the modification to the first file block, for placing the first file image in a storage block associated with the snapshot module, and for storing the image of the first file image including the modification to the first file block in the first file block; and
    computer usable program code, responsive to placing the first file image in the storage block, for updating the first block to include a first reference address of the storage block, and marking the image of the first file image including the modification to the first file block to be copied to the snapshot module upon deletion of the image of the first file image including the modification to the first file block.

9. The computer program product of claim 8, wherein the file system utilizes "inherit-on-delete" block management.

10. The computer program product of claim 9, wherein the first temporary file has been marked inherit-on-delete.

11. The computer program product of claim 9, wherein the computer usable program code for placing the first file image in the storage block further comprises computer usable program code for allocating the storage block from a group of unallocated blocks, and computer usable program code for placing the first file image in the storage block.

12. The computer program product of claim 8, wherein the first temporary file comprises a second file block containing a second file image, the computer program product further comprising:
   computer usable program code for creating a snapshot of the first temporary file;
   computer usable program code, responsive to creating the snapshot, for copying the second file image to a second storage block associated with the snapshot module; and
   computer usable program code, responsive to copying the second file image to the second storage block, for updating the second file block to include a second reference address of the second storage block.

13. The computer program product of claim 12, wherein the snapshot does not include the first file block or the second file block.

14. The computer program product of claim 8, further comprising computer usable program code for terminating an open reference to the first file block, and computer usable program code, responsive to terminating the open reference, for marking the first file block as unallocated.

15. A data processing system comprising:
   a bus;
   a communications unit connected to the bus;
   a storage device connected to the bus, wherein the storage device includes computer usable program code; and
   a processor unit connected to the bus, wherein the processor unit executes the computer usable program code to identify a first file, wherein the first file is a temporary file, and the first file comprises a first file block containing a first file image;
   responsive to identifying the first file, determine whether the first file image has been marked to be moved to a snapshot module upon deletion of the first file image; responsive to a determination that the first file image has been marked to be moved to the snapshot module upon deletion and responsive to receiving a modification to the first file block, create an image of the first file image including the modification to the first file block, place the first file image in a storage block associated with the snapshot module, and store the image of the first file image including the modification to The first file block in the first file block; and responsive to placing the first file image in the storage block, update the first block to include a first reference address of the storage block, and mark the image of the first file image including the modification to the first file block to be copied to the snapshot module upon deletion of the image of the first file image including the modification to the first file block.

16. The data processing system of claim 15, wherein the processor unit executing the computer usable program code to place the first file image in the storage block further comprises processor unit executing the computer usable program code to allocate the storage block from a group of unallocated blocks, and place the first file image in the storage block.

17. The data processing system of claim 15, wherein the first file comprises a second file block containing a second file image, and wherein the processor unit further executes the computer usable program code to create a snapshot of the first temporary file; responsive to creating the snapshot, copy the second file image to a second storage block associated with the snapshot module; and responsive to copying the second file image to the second storage block, update the second file block to include a second reference address of the second storage block.

18. The data processing system of claim 15, wherein the processor unit further executes the computer usable program code to terminate an open reference to the first file block, and responsive to terminating the open reference, mark the first file block as unallocated.

* * * * *